McCLELLAN C. SHARRAR.
DIRIGIBLE LIGHT.
APPLICATION FILED APR. 2, 1917.

1,257,408.

Patented Feb. 26, 1918.

INVENTOR
McClellan C. Sharrar.

WITNESSES

BY
ATTORNEY

UNITED STATES PATENT OFFICE.

McCLELLAN C. SHARRAR, OF TOLEDO, OHIO.

DIRIGIBLE LIGHT.

1,257,408.  Specification of Letters Patent.  Patented Feb. 26, 1918.

Application filed April 2, 1917. Serial No. 159,280.

*To all whom it may concern:*

Be it known that I, MCCLELLAN C. SHARRAR, a citizen of the United States, residing at Toledo, in the county of Lucas and State of Ohio, have invented certain new and useful Improvements in Dirigible Lights, of which the following is a specification.

This invention relates to a device for supporting a lamp on an automobile and the principal object of the invention is to provide a device of this character which will so support the lamp that the light therefrom will follow the movement of the front wheels so as to light the road on curves as well as on the straight parts.

Another object of the invention is to provide means whereby the lamp is caused to turn by the movement of the steering wheel.

Another object is to provide simple means whereby the improvement may be readily attached to existing models of automobiles without making but little change thereto.

Another object of the invention is to provide means whereby the attachment is connected to the end of the front axle and is operated from the knuckle hub of the stub shaft.

Another object of the invention is to provide means whereby the attachment may be provided with extension means so the lamp may occupy any desired position in relation to the front of the car.

The invention also consists in certain other features of construction and in the combination and arrangement of the several parts, to be hereinafter fully described, illustrated in the accompanying drawings, and specifically pointed out in the appended claims.

In describing my invention in detail, reference will be had to the accompanying drawings, wherein like characters denote like or corresponding parts throughout the several views, and in which.

Figure 1:
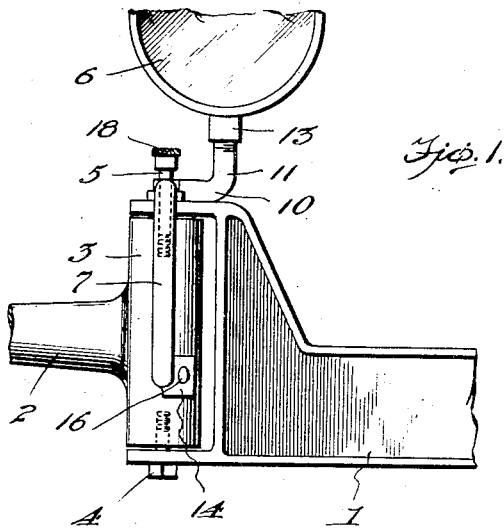
Figure 1 is a front view, showing the invention applied to the front axle of an automobile.
Figure 4:
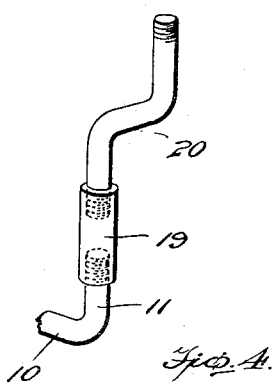
Fig. 4 is a detail.
Figure 3:
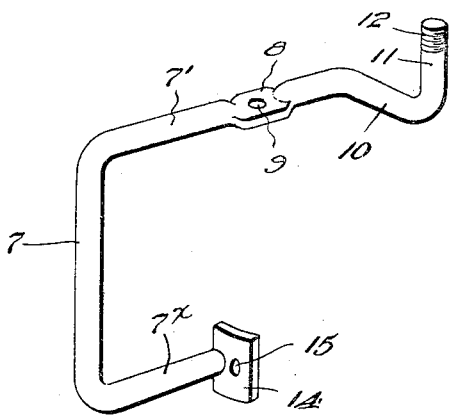
Fig. 3 is a perspective view of the supporting means.
Figure 2:
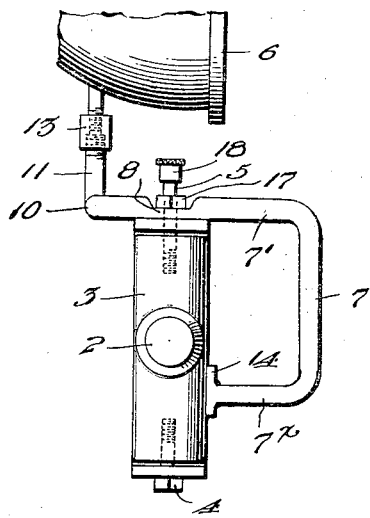
Fig. 2 is an end view.

In these figures, 1 indicates the front axle of the automobile, 2 the stub shaft and 3 the knuckle hub secured to the axle by means of the pivots 4 and 5. The lamp is indicated at 6 and this lamp is carried by a member 7 of substantially U-shape, but having the leg 7' of greater length than the leg 7$^\times$ and said leg 7' is provided with a flat portion 8 provided with a hole 9 and at its end said leg 7' is bent at right angles to form an extension 10 and said extension is bent upwardly at right angles to form a lamp-engaging part 11, said part being screw-threaded as at 12 to engage the collar 13 on the lamp. The leg 7$^\times$ is provided with a curved plate 14 and said plate has a hole 15 therein through which a screw 16 passes to secure said plate to the knuckle hub 3. The member 7 is so proportioned that when the plate 14 is secured to the knuckle hub the opening 9 will aline with the pivot 5 of said knuckle hub and I provide said pivot 5 with an extension to pass through said hole 9 and a nut 17 on said pivot 5 holds the member 7 in place on the top of the extreme end of the axle. This pivot is provided with an oil cup 18. The bent portion 10 will throw the lamp-carrying part 11 inwardly to one side of the knuckle hub 3 so as to place the lamp to one side of the mud guard.

I prefer to use a sleeve 19 and a Z-shaped part 20 to be used in connection with the member 7 whereby the lamp may be placed in any desired position in relation to the front of the car.

It will be seen that the lamp will follow the movement of the front wheels of the car, as whenever the knuckle hub 3 is turned the member 7 will be turned also, and this carries the lamp with it.

It is thought from the foregoing that the advantages and novel features of my invention will be readily apparent.

I desire it to be understood that I may make slight changes in the construction and in the combination and arrangement of the several parts provided that such changes fall within the scope of the appended claims.

I claim as my invention:

1. A dirigible light for automobiles comprising a member having a part pivoted to a rigid part of the automobile and a second part secured to the knuckle hub of the automobile, and means for connecting a lamp to said pivoted part.

2. A dirigible light for automobiles comprising a lamp, a member having a part pivoted to the end of the axle and a second part secured to the knuckle hub of the automobile, and means for connecting the lamp to said pivoted part.

3. A dirigible light for automobiles comprising a lamp, a member having a portion pivoted to the end of the axle and a second portion connected with the knuckle hub of the automobile, and adjustable means for connecting the lamp with said pivoted part.

4. A dirigible light for automobiles comprising a lamp, a U-shaped member, a plate carried by one leg of the U-shaped member, means for securing the said plate to the knuckle hub of an automobile, means for pivoting the other leg of the U to the upper pivot of the knuckle hub, said leg having an extension thereon, and means for securing the lamp to said extension.

5. A dirigible light for automobiles comprising a lamp, a U-shaped member, a plate carried by one leg of the U-shaped member, means for securing the said plate to the knuckle hub of an automobile, means for pivoting the other leg of the U to the upper pivot of the knuckle hub, said leg having an extension thereon, and means for securing the lamp to said extension, said means consisting of a sleeve and an upwardly extending rod screwed in said sleeve.

In testimony whereof I affix my signature in presence of two witnesses.

McCLELLAN C. SHARRAR.

Witnesses:
MINNIE SMITH,
E. C. STEWART.

Copies of this patent may be obtained for five cents each, by addressing the "Commissioner of Patents, Washington, D. C."